G. BLUEMEL.
POWER TRANSMITTING MECHANISM.
APPLICATION FILED DEC. 22, 1915.
1,233,967.
Patented July 17, 1917.
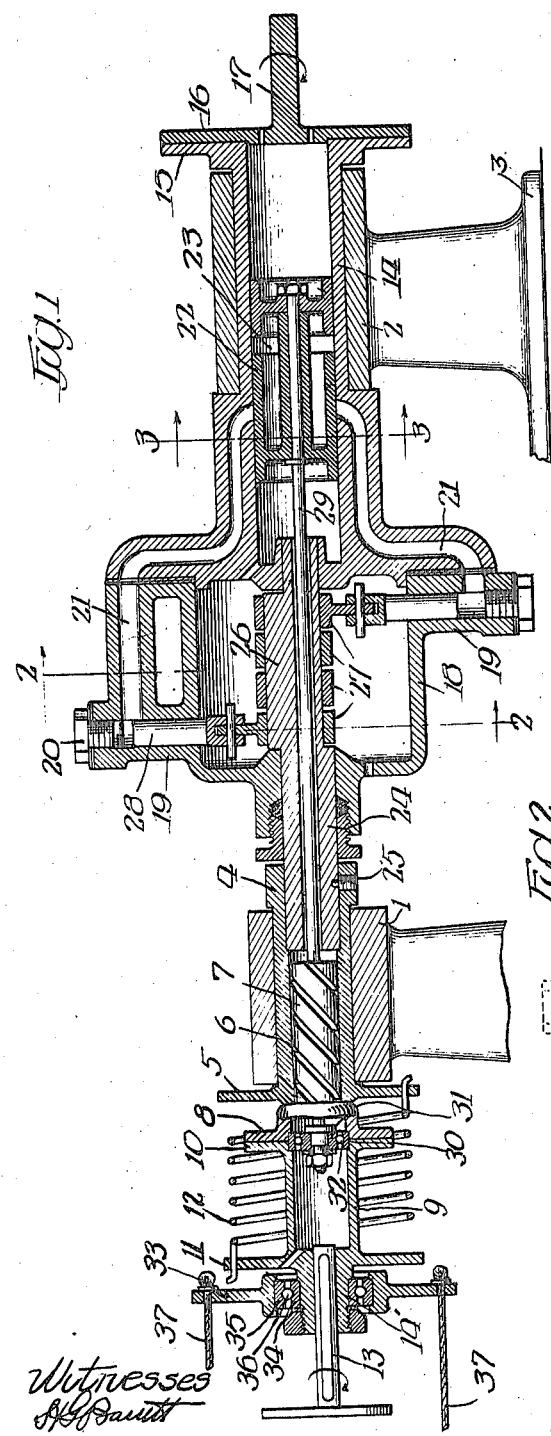
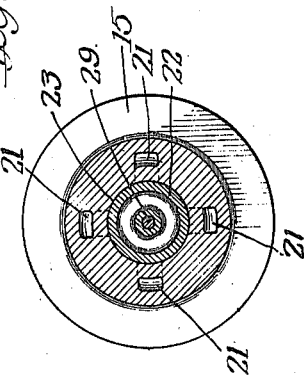
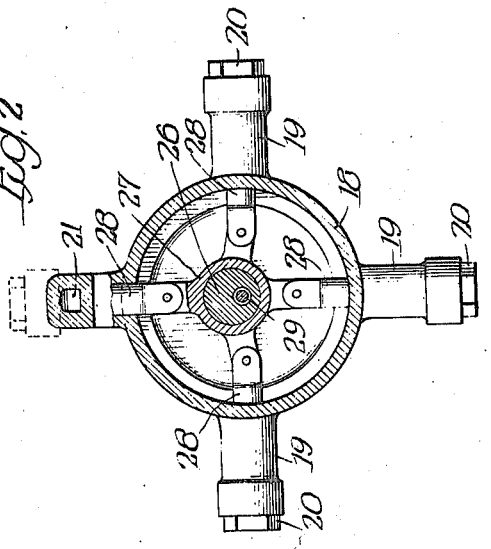
Inventor
Gustav Bluemel

UNITED STATES PATENT OFFICE.

GUSTAVE BLUEMEL, OF TOLEDO, OHIO, ASSIGNOR OF ONE-HALF TO WILLIAM M. SIMPSON, OF CHICAGO, ILLINOIS.

POWER-TRANSMITTING MECHANISM.

1,233,967.

Specification of Letters Patent.   Patented July 17, 1917.

Application filed December 22, 1915.   Serial No. 68,159.

*To all whom it may concern:*

Be it known that I, GUSTAVE BLUEMEL, a subject of the Emperor of Austria, residing at Toledo, in the county of Lucas and State of Ohio, have invented certain new and useful Improvements in Power-Transmitting Mechanism, of which the following is a specification.

This invention relates in general to a power transmitting mechanism and more particularly to a maximum torque clutch.

One of the difficulties attendant upon the use of internal combustion engines is that this form of prime mover is incapable of taking an overload so that when conditions are met which produce an overload the engine is immediately and helplessly stalled.

It is the principal object of my invention to provide a power transmitting mechanism adapted for use between an internal combustion engine and the load to which the power is applied, whereby when overload conditions arise the engine is allowed to continue in operation at its normal rate of speed and to transmit the full torque to the load.

Further objects and advantages of my invention will be apparent as it is better understood by reference to the following specification when read in connection with the accompanying drawing, illustrating the preferred embodiment thereof, in which—

Figure 1 is a vertical longitudinal section through the mechanism according to my invention;

Fig. 2 is a vertical section on the line 2—2 of Fig. 1, and

Fig. 3 is a vertical section on the line 3—3 of Fig. 1.

Referring to the drawing, 1 and 2 indicate bearings which may be supported in any suitable manner, as for example on a base 3. Rotatably mounted in the bearing 1 is a sleeve 4, provided at one extremity with a flange 5 and threaded internally at 6 to receive a correspondingly threaded thrust member 7 having at one extremity a flange 8. A hollow member 9, provided with flanges 10 and 11, is mounted coaxially with the member 7, the flanges 8 and 10 being secured together in any suitable manner. The torsion spring 12 is disposed about the member 9 with its opposite ends in operative engagement with the flanges 5 and 11. A driving shaft 13 is keyed to an extension 14′ of the member 9 and may be connected to an internal combustion engine (not shown) in any desirable manner.

Rotatably mounted in the bearing 2 is a hollow member 14 having a flange 15 at one end thereof to which is secured a flange 16 of the driven shaft 17, which may be connected in any suitable manner to the load to which the power is applied. The member 14 is enlarged at 18 and provided with a plurality of cylinders 19 projecting from its periphery, the outer ends of the cylinders 19 being closed by plugs 20 threadedly secured therein. From the interior of each of the cylinders 19 a duct 21 leads to the interior of the member 14, the ends of the ducts 21 being, however, normally closed by a cylindrical slide valve 22 having ports 23 in its outer shell, whereby, when the slide valve is moved to a position wherein its ports 23 register with the ends of the ducts 21, fluid, which partially fills the cylinders 19 and the ducts 21, may circulate between the cylinders 19. A hollow shaft 24 extends into the sleeve 4 and is operatively connected thereto by a pin 25. A portion of the hollow shaft 24 projects into the chamber formed by the enlarged portion 18 of the member 14 and is eccentric to its axis, as indicated at 26. A plurality of eccentric sleeves 27 surround the eccentric portion 26 of the hollow shaft 24 and a plunger 28 is connected to each of the sleeves 27, the plungers 28 being disposed in the cylinders 19 so that, if the eccentric portion 26 rotates with respect to the member 14, the plungers 28 will be reciprocated in their respective cylinders 19.

The slide valve 22 is secured to one end of a rod 29 slidably mounted within the hollow shaft 24 and the member 7, the opposite end of the rod 29 being connected to the members 7 and 9 at the junction thereof by means of a pair of sleeves 30 and 31 between which are disposed ball bearings 32. This arrangement allows the members 7 and 9 to rotate without rotating the rod 29 but insures the longitudinal movement of the rod 29, when the members 7 and 9 are moved in a direction longitudinally thereof, in a manner presently to be described.

Normally, when the shaft 13 is caused to rotate in the direction of the arrow in Fig. 1 by the application of power from the engine, the entire system rotates as a unit, the power being transmitted through the flange 11, spring 12, to the flange 5 of the sleeve 4, through the pin 25 to the hollow shaft 24 and thence through the plungers 28 to the member 14 and the shaft 17, it being understood that the slide valve 23 is in the position indicated in the drawing and that hence the fluid in the cylinders 19 can not circulate between the respective cylinders through the ducts 21. Should an overload be applied to the shaft 17 there will be an immediate tendency to retard the shaft 17 and the member 14 and consequently the member 9, which is connected to the engine, will rotate in the direction of the arrow with respect to the sleeve 4 which, as previously explained, is connected to the member 14 through the medium of the plungers 28 and the fluid contained within the cylinders 19 and the ducts 21. The member 7, because of its threaded connection to the sleeve 4, will immediately move to the left, viewing Fig. 1, carrying with it the rod 29 and the slide valve 22 until the ports 23 register with the ends of the ducts 21, whereupon circulation of the fluid between the cylinders 19 will commence and thus allow the shaft 13 to continue to rotate at the required speed to maintain the torque of the engine while the shaft 17 is rotated at a lower rate of speed but with the full torque of the engine. If the overload is such that the shaft 17 can not rotate, the slide valve 22 will move to a position wherein the ends of the ducts 21 are entirely uncovered, but otherwise the slide valve 22 will so position itself that the difference between the speeds of rotation of the shafts 13 and 17 is exactly balanced by the slip allowed by the circulation of the fluid between the cylinders 19. The function of the spring 12 is obviously to allow a different rate of rotation between the sleeve 4 and the member 9 until the slide valve 22 has moved to such a position as to allow circulation of the fluid between the cylinders 19, the spring 12 being tensioned during this phase of the operation. The thread 6 on the sleeve 4 and the member 7 is preferably of a multiple pitch to insure rapid action of the slide valve 22.

In order that the device may be employed without an additional clutch in starting the engine I provide a flanged member 33 connected to the extension 14' of the member 9 by means of a pair of collars 34 and 35, between which are ball bearings 36. The threads 6 on the sleeve 4 and member 7 are preferably of a multiple pitch or, in other words, of the well-known spiral form, so that by means of connections 37 the member 9 may be manually moved longitudinally to position the port 23 opposite the ends of the ducts 21, thus freeing the engine from the load. When the connections 37 are released the spring 12 will cause the slide valve 22 to close the ends of the ducts 21 so that power is transmitted to the shaft 17.

It will be readily understood from the foregoing that I have perfected a means whereby the stalling of internal combustion engines owing to the application of overloads thereto is effectually prevented, the mechanism also serving as a clutch to free the engine before starting. By the use of the maximum torque clutch described it is possible to employ internal combustion engines for many purposes for which they have not heretofore been adapted, my invention overcoming the principal disability of prime movers of this type.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. A power transmitting mechanism comprising a driving shaft, a driven shaft, an intermediate rotatable element, resilient means connecting said driving shaft and intermediate element, normally inoperative fluid pressure means connecting said intermediate element and driven shaft, a thrust member in said intermediate element, a valve controlling said fluid pressure means, and means engaging said thrust member, connected to said valve and to said driving shaft and automatically operative, after said resilient means has permitted differential rotation of said thrust member and the means engaging therewith, to operate said valve and thereby permit said fluid pressure means to operate whereby said driving and driven shafts rotate at different angular speeds.

2. A power transmitting mechanism comprising a driving shaft, a driven shaft, an intermediate rotatable element, resilient means connecting said driving shaft and intermediate element, normally inoperative fluid pressure means connecting said intermediate element and driven shaft including a plurality of radially disposed cylinders each provided with a duct leading therefrom, plungers in said cylinders and means on said intermediate element to actuate said plungers, a thrust member in said intermediate element, a valve controlling said ducts, and means engaging said thrust member, connected to said valve and to said driving shaft and automatically operative, after said resilient means has permitted differential rotation of said thrust member and the means engaging therewith, to operate said valve, and connect said ducts thereby permitting said plungers to operate whereby said driving and driven shafts rotate at different angular speeds.

3. A power transmitting mechanism, comprising a driving shaft, a driven shaft, and a driving connection therebetween, whereby said driven shaft is normally actuated by said driving shaft, said driving connection including a member operatively connected to said driven shaft and provided with a plurality of radially disposed and fluid-containing cylinders, each having a duct leading therefrom, plungers in said cylinders, means for actuating said plungers, an internally threaded sleeve connected to said plunger-actuating means, a resilient connection between said driving shaft and sleeve, a valve to normally prevent communication between said ducts and thereby render said plungers inactive, a threaded member engaging the threads of said sleeve and connected to said driving shaft, and a connection between said threaded member and valve, whereby the latter may be moved to establish communication between said ducts and allow said plungers to operate.

4. A power transmitting mechanism, comprising a driving shaft, a driven shaft, and a driving connection therebetween, whereby said driving and driven shafts are normally rotated at the same angular speed, said driving connection including a member operatively connected to said driven shaft and provided with a plurality of radially disposed and fluid-containing cylinders, each having a duct leading therefrom, plungers in said cylinders, eccentric means for actuating said plungers, an internally threaded sleeve connected to said eccentric means, a torsion spring connecting said driving shaft and sleeve, a valve to normally prevent communication between said ducts and thereby render said plungers inactive, a threaded member engaging the threads of said sleeve and connected to said driving shaft, and a connection between said threaded member and valve whereby the latter is automatically moved to establish communication between said ducts when an overload is encountered by said driven shaft.

5. A power transmitting mechanism, comprising a driving element, a driven element, an intermediate element, resilient means rotatably connecting said driving and intermediate elements, normally inoperative fluid pressure means connecting said intermediate and driven elements, a thrust member on said intermediate element, and means connected to said driving element, engaging said thrust member and automatically operative after said resilient means has permitted relative movement of said driving and intermediate elements to allow said fluid pressure means to operate, thereby permitting rotary movement of said driving element relative to said driven element.

GUSTAVE BLUEMEL.

Witnesses:
ELIZABETH M. SIELOFF,
ELIZABETH A. KOSTER.